United States Patent
Wiedeman et al.

(10) Patent No.: US 6,775,519 B1
(45) Date of Patent: *Aug. 10, 2004

(54) METHOD AND APPARATUS FOR ACCOUNTING FOR USER TERMINAL SESSION-BASED CONNECTION TO A SATELLITE COMMUNICATION SYSTEM

(75) Inventors: Robert A. Wiedeman, Los Altos, CA (US); Michael J. Sites, Fremont, CA (US); Paul A. Monte, San Jose, CA (US)

(73) Assignee: Globalstar L.P., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,015

(22) Filed: Jan. 13, 2000

Related U.S. Application Data

(63) Continuation-in-part of application No. 08/819,048, filed on Mar. 17, 1997, now Pat. No. 6,023,606, which is a continuation of application No. 08/474,443, filed on Jun. 7, 1995, now Pat. No. 5,664,006.

(51) Int. Cl.[7] .......................... H04B 7/185; H04Q 7/20; H04M 1/00; G01R 31/08; G06F 11/00
(52) U.S. Cl. ...................... 455/12.1; 455/434; 455/553; 370/252; 370/321; 370/329; 370/337; 370/401; 370/468; 707/1; 714/752
(58) Field of Search .............................. 707/1; 370/252, 370/468, 337, 329, 401, 321, 259; 714/752; 455/553, 12.1, 434, 426, 331; 379/106.03; 340/7.34

(56) References Cited

U.S. PATENT DOCUMENTS 5,301,223 A * 4/1994 Amadon et al. ............ 455/331
5,526,404 A   6/1996 Wiedeman et al. .......... 379/60
5,588,148 A * 12/1996 Landis et al. ................ 707/1
5,623,269 A   4/1997 Hirshfield et al. .......... 342/354

(List continued on next page.)

FOREIGN PATENT DOCUMENTS

| EP | 0601523 | * | 6/1994 |
| GB | 2 320 162 | | 12/1996 |
| GB | 2 332 825 | | 2/1998 |
| JP | 09116650 | * | 5/1997 |
| JP | 2000252979 | * | 9/2000 |
| JP | 2001016654 | * | 1/2001 |

OTHER PUBLICATIONS

*Globalstar: a Transparent System* by D. Rouffet, 1225 Electrical Communication (1993) 1st Quarter, Romford, Essex, GB, pp.84–90.

*Primary Examiner*—William Cumming
(74) *Attorney, Agent, or Firm*—Karambelas & Associates

(57) ABSTRACT

A method is disclosed for operating a satellite communications system for coupling a user terminal to a data communications network. The method has steps of (a) establishing a connectionless packet data transmission link between the user terminal and a gateway that is coupled to the user terminal through at least one satellite via an inbound link and an outbound link, the gateway being further coupled to the data communications network and being associated with a gateway service provider; (b) deriving billing-related information by counting a number of units of data that comprise data packets that are transmitted over at least one of the inbound link and the outbound link; (c) aggregating the billing-related information with billing-related information for other user terminals; (d) transferring the aggregated billing-related information to a satellite communication system operator site; and (e) at the satellite communication system operator site, determining an amount to bill the gateway service provider based at least in part on the aggregated billing-related information. The step of establishing the connectionless packet data transmission link may include a step of varying a bandwidth of the link to accommodate different data rate requirements.

23 Claims, 11 Drawing Sheets

U.S. PATENT DOCUMENTS

| | | | | |
|---|---|---|---|---|
| 5,664,006 A | | 9/1997 | Monte et al. | 455/405 |
| 5,729,531 A | * | 3/1998 | Raith et al. | 370/252 |
| 5,751,731 A | * | 5/1998 | Raith | 714/752 |
| 5,757,784 A | | 5/1998 | Liebowitz et al. | 370/321 |
| 5,757,813 A | * | 5/1998 | Raith | 370/468 |
| 5,768,267 A | * | 6/1998 | Raith et al. | 370/329 |
| 5,802,445 A | | 9/1998 | Wiedeman et al. | 455/12.1 |
| 5,806,007 A | * | 9/1998 | Raith et al. | 340/7.34 |
| 5,845,215 A | * | 12/1998 | Henry et al. | 455/553 |
| 5,903,552 A | * | 5/1999 | Raith | 370/337 |
| 5,907,555 A | * | 5/1999 | Raith | 370/468 |
| 5,910,949 A | * | 6/1999 | Bilstrom et al. | 370/337 |
| 5,913,164 A | * | 6/1999 | Pawa et al. | 455/12.1 |
| 6,016,428 A | * | 1/2000 | Diachina et al. | 370/329 |
| 6,018,726 A | * | 1/2000 | Tsumura | 379/106.03 |
| 6,023,470 A | * | 2/2000 | Lee et al. | 370/401 |
| 6,044,270 A | * | 3/2000 | Raith | 455/434 |
| 6,081,514 A | * | 6/2000 | Raith | 370/321 |
| 6,091,960 A | * | 7/2000 | Raith et al. | 455/426 |
| 6,157,845 A | * | 12/2000 | Henry et al. | 455/553 |
| 6,226,272 B1 | * | 5/2001 | Okano et al. | 370/259 |

* cited by examiner

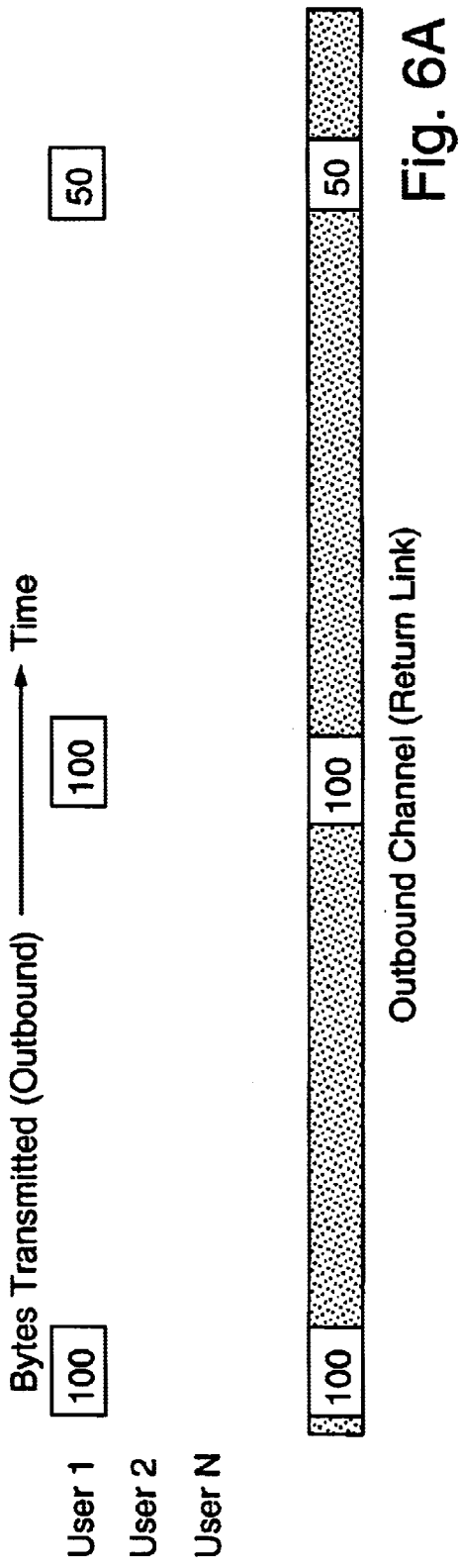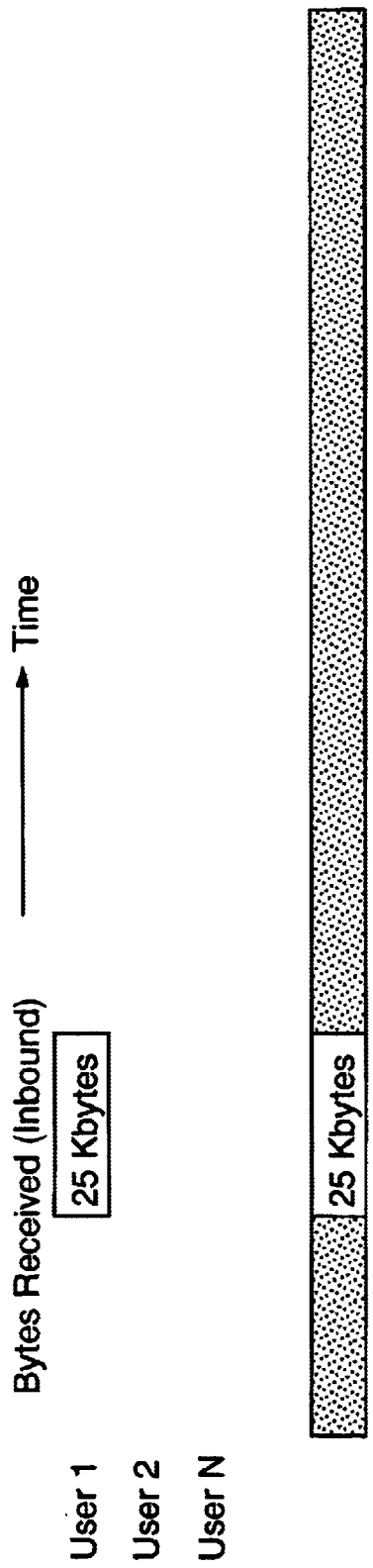

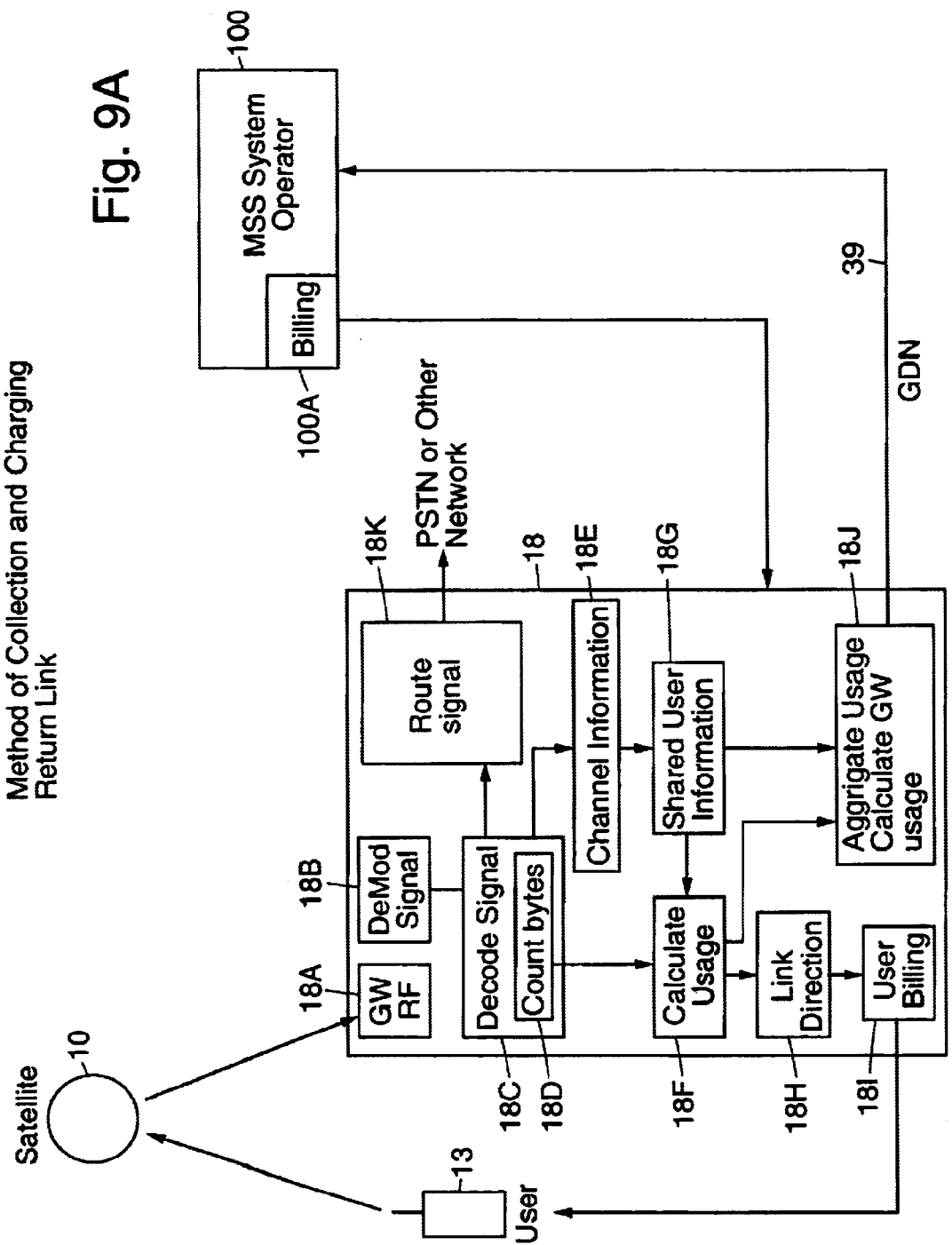

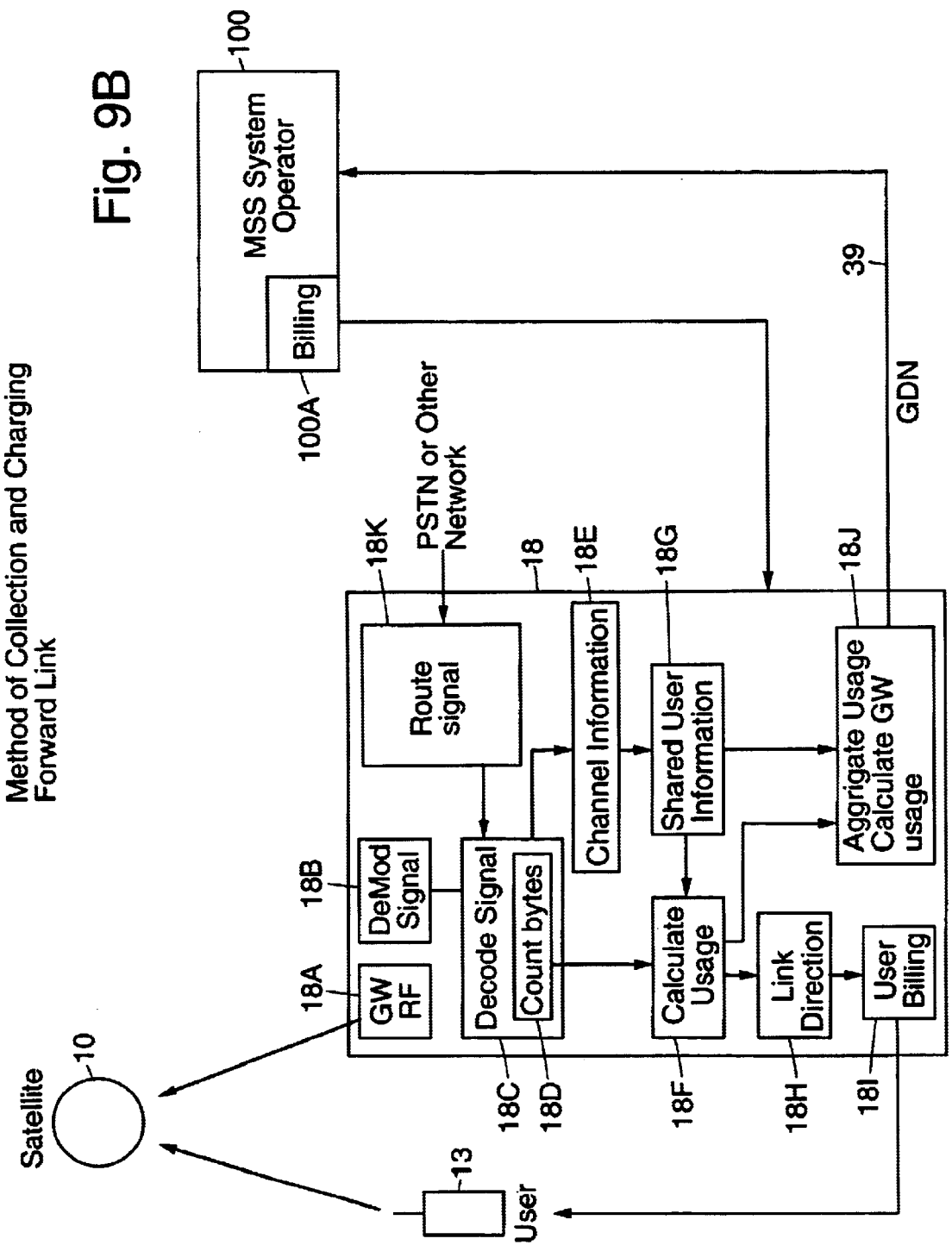

METHOD AND APPARATUS FOR ACCOUNTING FOR USER TERMINAL SESSION-BASED CONNECTION TO A SATELLITE COMMUNICATION SYSTEM

CROSS-REFERENCE TO A RELATED PATENT APPLICATION

This patent application is a continuation-in-part of U.S. patent application Ser. No. 08/819,048, filed Mar. 17, 1997, which issued as U.S. Pat. No. 6,023,606 on Feb. 8, 2000, and which is entitled "METHOD FOR ACCOUNTING FOR USER TERMINAL CONNECTION TO A SATELLITE COMMUNICATIONS SYSTEM", by Robert A. Wiedeman, Paul A. Monte and Michael J. Sites, the disclosure of which is incorporated by reference herein in its entirety insofar as it does not conflict with the teachings of this invention, which in turn is a continuation of U.S. patent application Ser. No. 08/474,443, filed Jun. 7, 1995, also entitled "METHOD FOR ACCOUNTING FOR USER TERMINAL CONNECTION TO A SATELLITE COMMUNICATONS SYSTEM", by Robert A. Wiedeman, Paul A. Monte and Michael J. Sites, now U.S. Pat. No. 5,664,006, the disclosure of which is incorporated by reference herein in its entirety insofar as it does not conflict with the teachings of this invention.

FIELD OF THE INVENTION

This invention relates generally to communications systems and, in particular, to satellite communications systems wherein a plurality of user terminals are in bi-directional wireless communication with a terrestrial communications network via a gateway and at least one satellite.

BACKGROUND OF THE INVENTION

In conventional terrestrial cellular communication systems it is often the case that a user is billed at a predetermined rate on a per minute basis for the use of the system. However, in a satellite-based communication system this type of billing arrangement may not accurately reflect a correct billing amount. By example, a user who is uploading or downloading a large data file though a satellite at 9.6 kb/s will most likely consume more of the system resources (e.g., satellite power) than another user who is engaged in a voice communication at an average speech bit rate of less than 4 kb/sec. The result is that an inequitable billing arrangement may exist, whereby some users effectively subsidize the usage of the system by other users.

The above-referenced U.S. Pat. No. 5,664,006 and the continuation application thereof teach the monitoring of various parameters of the communication link(s), for example, the amount of system power and/or bandwidth that is used, to derive an amount to bill for a connection. Also taught is the accumulation of system usage data and the outputting of the data to a central site for use in billing a service provider.

While these disclosed techniques are very well suited for use in connection-oriented communications, such as circuit-switched voice connections, the inventors have realized that for so called "connectionless" communications, such as those found in packet-based communication sessions typified by those employing the Internet Protocol (IP), a different type of system usage accounting may be more desirable.

In a typical circuit switched system a particular circuit is assigned to and "owned by" a particular user until the connection is terminated (e.g., the user goes on-hook to end or release a voice call). In this case the connection may be thought of as a "tube", where information such as digitized voice or data is put in one end of the tube and then extracted at the other end of the tube. However, in a typical connectionless system each message (e.g., data packet or datagram) carries a full or partial address of a destination for the message, and each message can be routed through the data communications network and system independently of all other messages. It is possible in this case that a first datagram sent at time T1 can arrive later than a second datagram sent at a later time T2, depending on the routing particulars for each of the datagrams. In a connection-oriented system this type of operation is impossible.

OBJECTS AND ADVANTAGES OF THIS INVENTION

It is a first object and advantage of this invention to provide an improved method and apparatus for accounting for system usage in a connectionless type of satellite communication system.

It is another object and advantage of this invention to provide an improved method and apparatus for accounting for session-based system usage in a satellite communication system wherein users employ IP or other types of protocols.

It is a further object and advantage of this invention to provide an improved method and apparatus for aggregating system usage data for billing system service providers.

SUMMARY OF THE INVENTION

The foregoing and other problems are overcome and the objects and advantages of the invention are realized by a method and apparatus for accurately accounting for an amount of satellite communications system resources that are utilized for connectionless data communication links.

In accordance with the teachings herein an embodiment of a method is disclosed for operating a satellite communications system. The method includes the steps of (a) establishing a session with a user terminal using a gateway that is coupled to the user terminal through at least one satellite via an inbound link and an outbound link, where the gateway is further coupled to a data communications network; (b) during the connection, determining at the gateway a number of units of data transfer, such as bytes, that are used during the session on at least one of the inbound link and the outbound link; and (c) determining an amount to bill for the session based at least in part on the determined number of units of data transfer. The step of determining an amount to bill may also be based on a number of user terminals that simultaneously share a communication channel that carries at least one of said inbound link or said outbound link. The step of determining an amount to bill is preferably executed at a mobile satellite system operator site based on aggregated user billing information received from the gateway. The step of determining an amount to bill may also be executed at the gateway.

More particularly, disclosed herein is a method for operating a satellite communications system for coupling a user terminal to a data communications network. A satellite communications system that operates in accordance with the method is also envisioned. The method has steps of (a) establishing a connectionless packet data transmission link between the user terminal and a gateway that is coupled to the user terminal through at least one satellite via an inbound link and an outbound link, the gateway being further coupled to the data communications network and being associated with a gateway service provider; (b) deriving billing-related information by counting a number of units of data that comprise data packets that are transmitted over at least one of the inbound link and the outbound link; (c) aggregating the billing-related information with billing-related information for other user terminals; (d) transferring the aggregated billing-related information to a satellite communication system operator site; and (e) at the satellite communication system operator site, determining an amount to bill the gateway service provider based at least in part on the aggregated billing-related information. The step of establishing the connectionless packet data transmission link may include a step of varying a bandwidth of the link to accommodate different data rate requirements. The data packets are preferably transferred to and from a host computer in accordance with an Internet Protocol (IP). Further in accordance with embodiments of this invention the service provider billing can be based on a (bandwidth*time) product that is used on at least one of the inbound link and the outbound link or, during the session, by determining a number of units of content that are transferred at least from the gateway to the user terminal. Units of content may be, by example, downloaded pages and/or requested for specific units of content, such as stock market quotations.

In accordance with a further example of this invention a method allocates satellite system resources to a satellite system service provider based at least in part on a predicted demand for the satellite system resources for the satellite system service provider and, during a time that the satellite system resources are allocated to the satellite system service provider, executes further steps of recording an actual demand for the satellite system resources; comparing the actual demand to the predicted demand to determine a difference between the actual demand and the predicted demand; and then billing the satellite system provider an amount that is a function of the determined difference between the actual demand and the predicted demand.

BRIEF DESCRIPTION OF THE DRAWINGS

The above set forth and other features of the invention are made more apparent in the ensuing Detailed Description of the Invention when read in conjunction with the attached Drawings, wherein:

FIGS. 6A, 6B, 6C and 6D are diagrams that are useful in explaining the sharing of a physical channel for IP connections;

FIG. 9A is a block diagram of a gateway that is coupled to a user terminal through at least one satellite, and also to a mobile satellite system (MSS) operator through a ground data network (GDN), and which is useful in explaining a method of charging and collecting for a return link (from the user terminal to the gateway); and FIG. 9B is a similar block diagram of the gateway coupled to the user terminal through at least one satellite, and also to the MSS operator through the GDN, and which is useful in explaining a method of charging and collecting for a forward link (from the gateway to the user terminal)

DETAILED DESCRIPTION OF THE INVENTION

Before describing the teachings of this invention in further detail, it will be useful to review the FIGS. 1–5, which are found as well in the above-referenced U.S. Pat. No. 5,664,006 (incorporated by reference herein).

Figure 1:
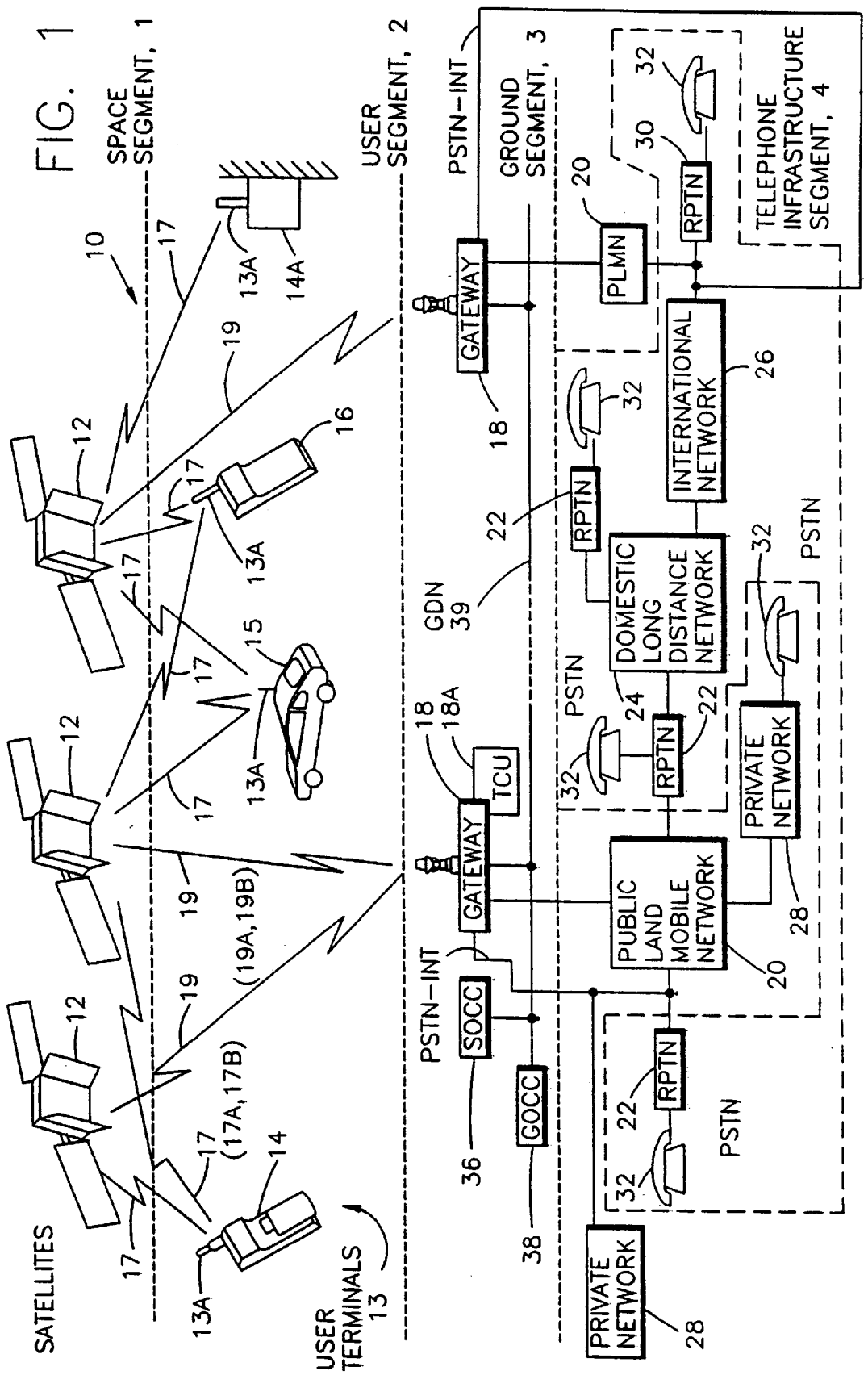
FIG. 1 is block diagram of a satellite communication system that is suitable for practicing the teachings of this invention.

FIG. 1 illustrates one presently preferred embodiment of a satellite communication system 10 that is suitable for use with the presently preferred embodiments of this invention. The communications system 10 may be conceptually subdivided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique.

The CDMA technique involves the use of a spreading code, such as a Walsh code, for each user. More than one spreading code can be assigned by the gateway 18 to a given user terminal 13 for use at any given time.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying. In other embodiments of the invention the satellites 12 may perform on-board signal processing. Also, there need be no direct communication link or links between the satellites 12 (inter-satellite links or ISLs). That is, each of the satellites 12 receives a signal only from a transmitter located in the user segment 2 or from a transmitter located in the ground segment 3, and transmits a signal only to a receiver located in the user segment 2 or to a receiver located in the ground segment 3. However, in other embodiments of this invention the satellites 12 may be provided with ISLs.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omni-directional antennas 13a for bidirectional communication via one or more of the satellites 12.

In accordance with aspects of this invention it will be assumed that at least some of the user terminals 13 are capable of transmitting and receiving datagrams, such as IP datagrams. For example, at least some of the user terminals comprise an ability to transmit and receive Internet-related communications, and may thus include an Internet browser or similar software for gaining access to World Wide Web (WWW) pages.

It is further noted that at least some user terminals 13 may be dual use devices that include circuitry for also communicating a conventional manner with a terrestrial cellular system.

Figure 3A:
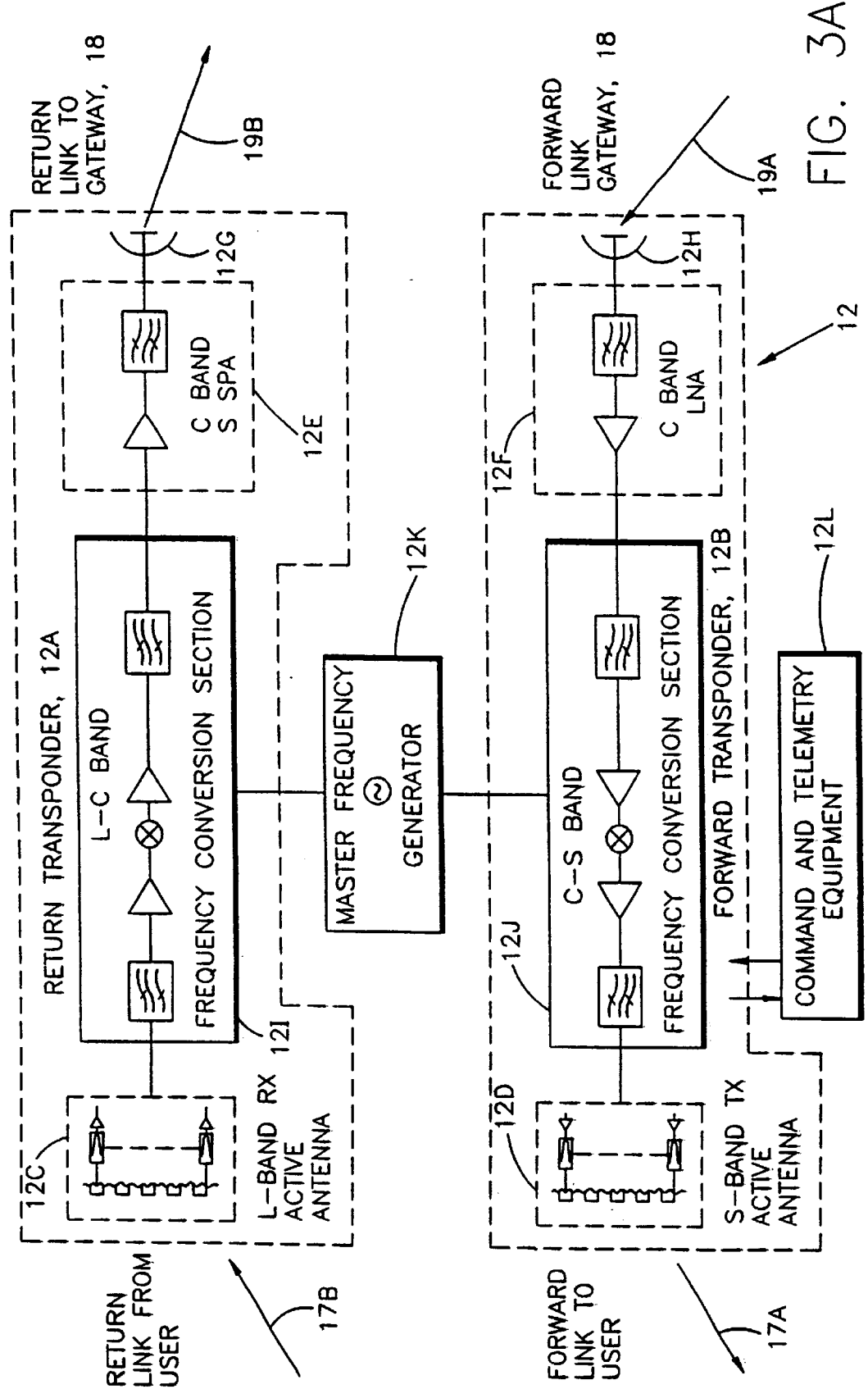
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link may be partitioned into 13 channels with up to, by example, 128 users being assigned per channel. The return link may have various bandwidths, and a given user terminal 13 may or may not be assigned a different channel than the channel assigned on the forward link. However, when operating in a diversity reception mode on the return link (receiving from two or more satellites 12), the user terminal 13 is preferably assigned the same forward and return link RF channel for each of the satellites.

The ground segment 3 includes at least one, but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 108°. This yields a coverage zone that is approximately 3500 miles in diameter.

Figure 3B:
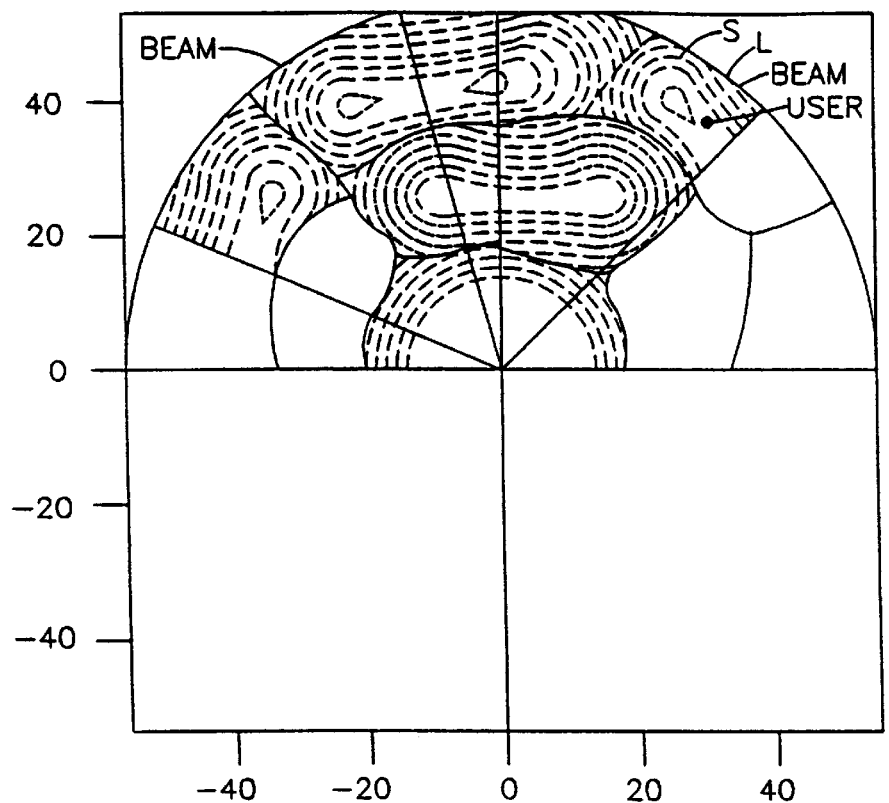
FIG. 3B illustrates a portion of a beam pattern that is associated with one of the satellites of FIG. 1.
Figure 4:
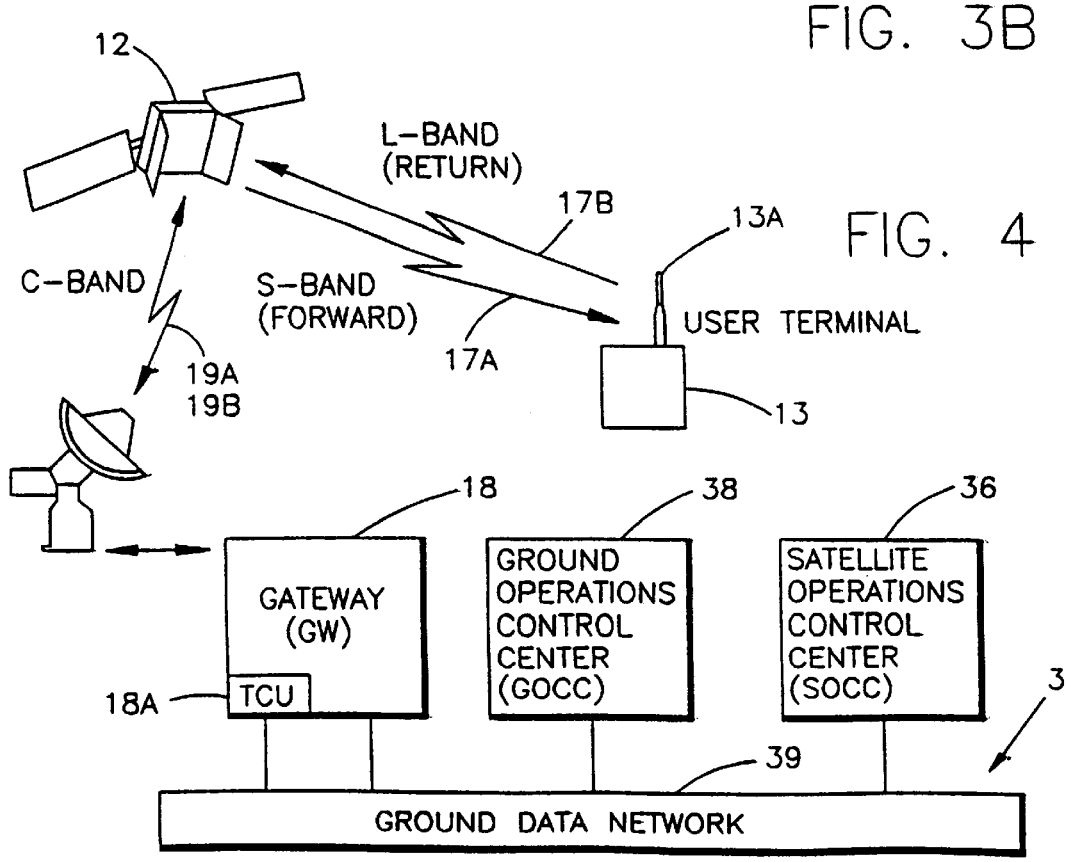
FIG. 4 is a block diagram that depicts the ground equipment support of satellite telemetry and control functions.
Figure 5:
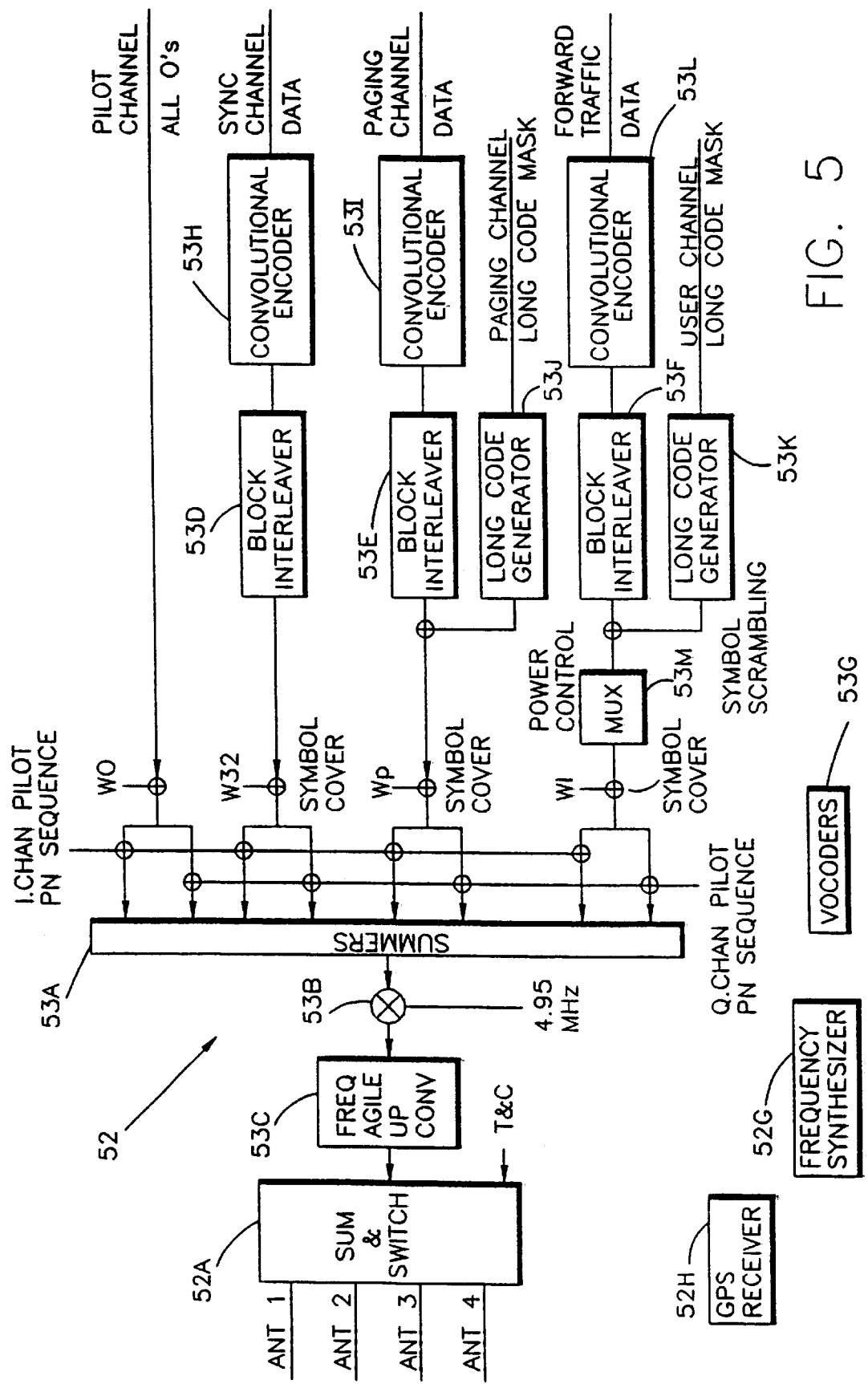
FIG. 5 is block diagram of the CDMA sub-system of FIG. 2.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation thus provides for diversity combining at the respective receivers, leading to an increased resistance to fading and facilitating the implementation of a soft handoff procedure.

It is pointed out that all of the frequencies, bandwidths, elevation angles and the like that are described herein are representative of but one particular satellite communication system. Other frequencies, bands of frequencies, elevation angles and the like may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz) could be used.

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, issued Jun. 6, 1995, by E. Hirshfield and C. A. Tsao, entitled "Mobile Communications Satellite Payload".

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

It is assumed for the purposes of this invention that the bidirectional data communication capability includes an ability to convey connectionless datagrams to and from at least some of the user terminals 13, and that the user terminals 13 can be coupled via the terrestrial (ground) segment 3 to the Internet and/or to other types of session-based data communications networks.

Also shown in FIG. 1 (and in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the communications system 10 provides overall system control functions.

Figure 2:
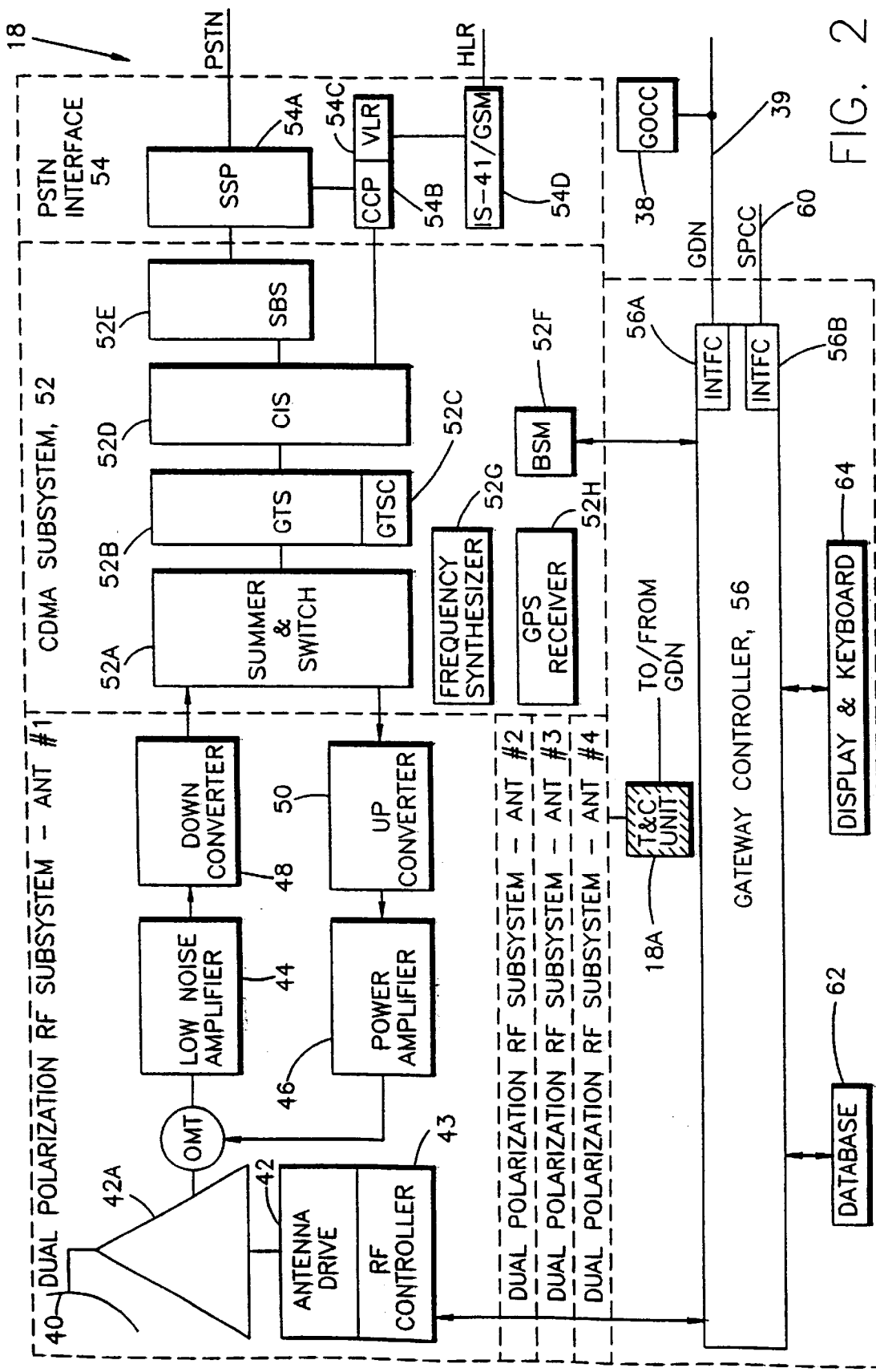
FIG. 2 is a block diagram of one of the gateways of FIG. 1.

FIG. 2 shows one of the gateways 18 in greater detail. Each gateway 18 includes up to four dual polarization RF C-band sub-systems each comprising a parabolic antenna 40, antenna driver 42 and pedestal 42a, low noise receivers 44, and high power amplifiers 46. All of these components may be located within a radome structure to provide environmental protection. A more detailed explanation of these and other gateway 18 components can be found in the above-referenced U.S. Pat. No. 5,664,006.

The foregoing has been a description of a presently preferred embodiment of the communication system 10. A description is now made of presently preferred embodiments of the present invention.

By way of introduction, IP-based systems can be based on sessions and, in fact, there is a "Session" layer in the OSI network layer stack, but not in the TCP/IP network layer stack. For the purposes of the teachings of this invention a "session" can be considered as a length of time that a user "executes", i.e., is actually sending or receiving information, when operating over the network.

The user terminal 13 may have from one to many sessions per unit of time, such as per hour or per day. One example session is as follows:

| | |
|---|---|
| Not Session | User starts a computer |
| Not Session | User starts Internet Service Provider (ISP) software |
| Not Session | User begins log-in process |
| Session | Computer completes modem checks and modem training |
| Session | Modem connects to ISP network |
| Session | ISP network verifies user |
| Session | ISP network opens welcome screen |
| Session | User sends and receives traffic |
| Session | User requests log-off (or log-off is initiated by ISP for some reason) |
| Session | ISP network executes log-off procedure |
| Not Session | Modem notifies computer software that session is over |
| Not Session | User closes ISP software |
| Not Session | User switches off computer |

During the time that the user is in "session" there may be long periods of time where the user is not actually utilizing the satellite communication system 10, but is instead, for example, reading an Internet page that was downloaded. During this time the satellite system resources may be used by another user, or the used satellite transmission power may be stored in a satellite battery for future use.

The use of the satellite system resource(s) may be expressed in terms of, for example, bandwidth, power, bits transmitted, or by the session. The following description discusses this in terms of typical usage. After the preliminary portion of the session, where the user (client) logs into the ISP network, the user (client) begins the traffic portion of the session. It is assumed that a client computer is bidirectionally coupled with a user terminal 13 for interfacing the client computer to the satellite communications system 10.

| | |
|---|---|
| Outbound Traffic: | |
| No Traffic | User clicks on an icon or types a message |
| No Traffic | User software forms request and begins packetizing the client message |
| Outbound Traffic | Modem of client computer 106 (see FIG. 8) begins packet transmission to host computer |
| Outbound Traffic | Data packets are sent over the satellite network to the host computer |
| No Traffic | Last packet is injected into the Internet by the gateway 18 |
| No Traffic | Travel time of complete message to host computer |
| Processing: | |
| No Traffic | Host computer receives entire message and decodes message |
| No Traffic | Host computer acts on message and requests services |
| No Traffic | Host computer forms return message (file transfer, data) |
| Inbound Traffic: | |
| No Traffic | Host begins packet transmission to client computer 106 |
| No Traffic | Packets are sent over the Internet to gateway 18 |
| Inbound Traffic | Packets are sent over the satellite network towards the client computer 106 |
| Inbound Traffic | Packets are received by the user terminal 13 |
| Inbound Traffic | Packets are decoded by the user terminal 13 and are passed to the client computer 106 |
| No Traffic | Packets are processed by the client computer software and the file or message is displayed |
| Inter-Session: | |
| No Traffic | User views or reads the response from the host computer |
| Additional Outbound Traffic: | Host computer responds if retransmission needed |
| Additional Inbound Traffic: | Client computer 106 responds if retransmission needed |

Based on the foregoing examples, and on practical experience, a typical traffic scenario for multiple users can be determined. First, the traffic is comprised of the user making requests for services. These requests are comprised of inquiries and download requests, are short in duration, and can contain but a few bytes of information. The responses to the client computer 106 are typically significantly longer, and contain data, file transfers, web pages and further instructions to the user. The inbound traffic can typically be 10 to 100 times the amount of the outbound traffic from the client computer 106 to the host computer. Therefore, the traffic is asymmetric in nature, with the user terminal 13 to gateway 18 (outbound) traffic being much smaller than the gateway 18 to user terminal 13 (inbound) traffic.

With regard to typical satellite traffic, where there are several users sharing the same channel, it has been determined that up to, for example, eight users can effectively simultaneously share a circuit, depending on a number of parameters. Reference can be made to FIGS. 6A, 6B, 6C and 6D for diagrams that are useful in explaining the sharing of a physical channel for IP connections. It can be seen in FIG. 6A that the Outbound (return link) has less data and utilizes the satellite link less than the Inbound (forward link) of FIG. 6B. Comparing FIGS. 6A and 6B to FIGS. 6C and 6D, it can also be seen that sharing the channel is much more efficient than giving a single user exclusive access to the channel. The more users in the channel the more packed the data becomes, and the more data per unit time can be transferred. At some point no additional users can be placed in the channel, and a new channel must be set up.

Figure 7:
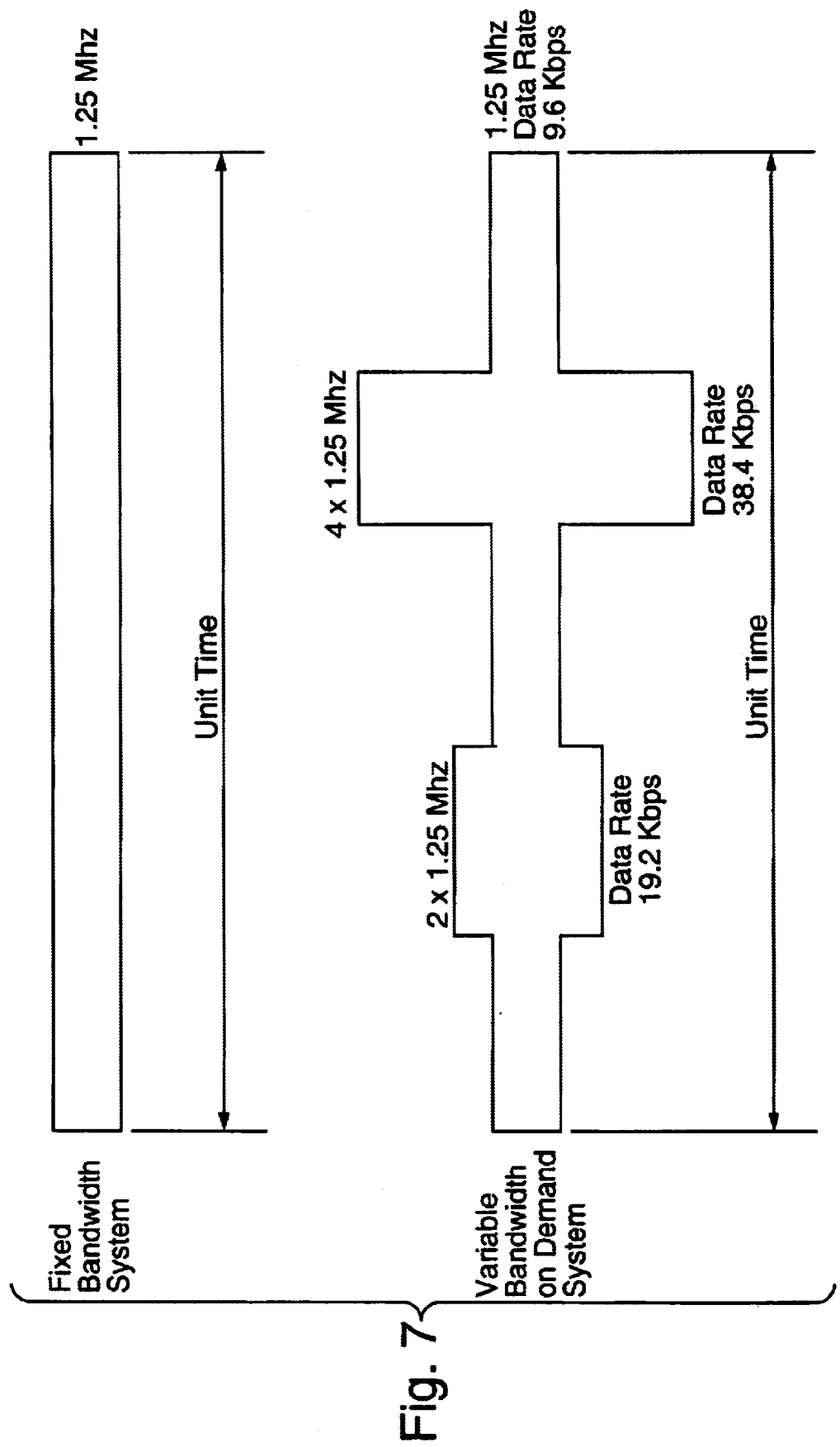
FIG. 7 is a diagram illustrating a difference between basic bandwidth data rate and power for a fixed bandwidth system and a variable bandwidth on demand system.

With regard to traffic models, it is noted that several could be employed. However, there are two fundamental traffic models of most interest to this invention, one is a fixed bandwidth model and the other is a variable bandwidth model. FIG. 7 is a diagram that illustrates a difference between a basic bandwidth data rate and power for a fixed bandwidth system model and a variable bandwidth on demand system model. Accounting for a fixed bandwidth (e.g., 1.25 MHz) system is relatively simple and straightforward, with the traffic being accounted for by charging for time on the satellite communication system 10, and/or for a number bytes sent in either or both directions, and/or by charging for the power used for transmission. However, accounting for the variable bandwidth on demand system is more complex (e.g., 1×1.25 MHz, 2×1.25 MHz, 4×1.25 MHz, etc.)

Figure 6C:
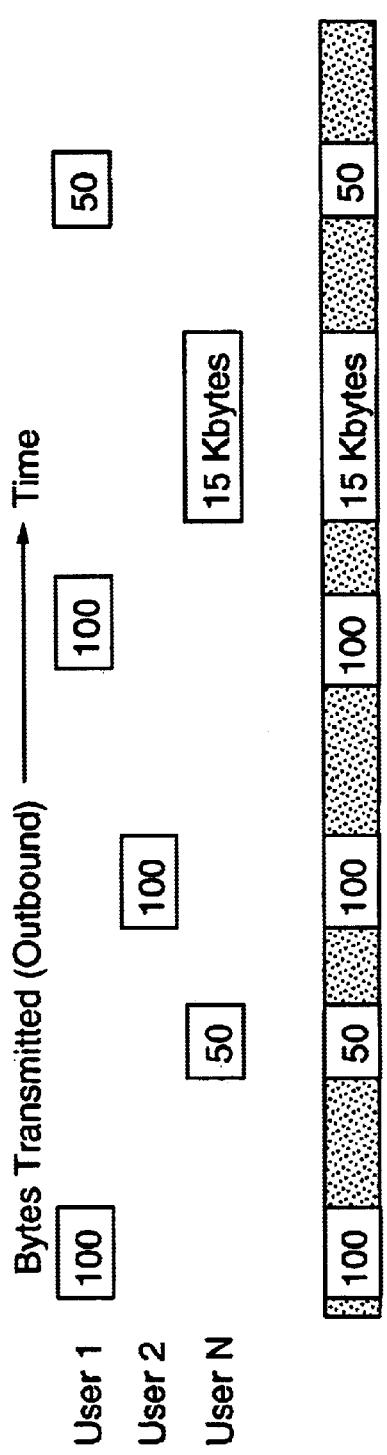
Figure 6D:
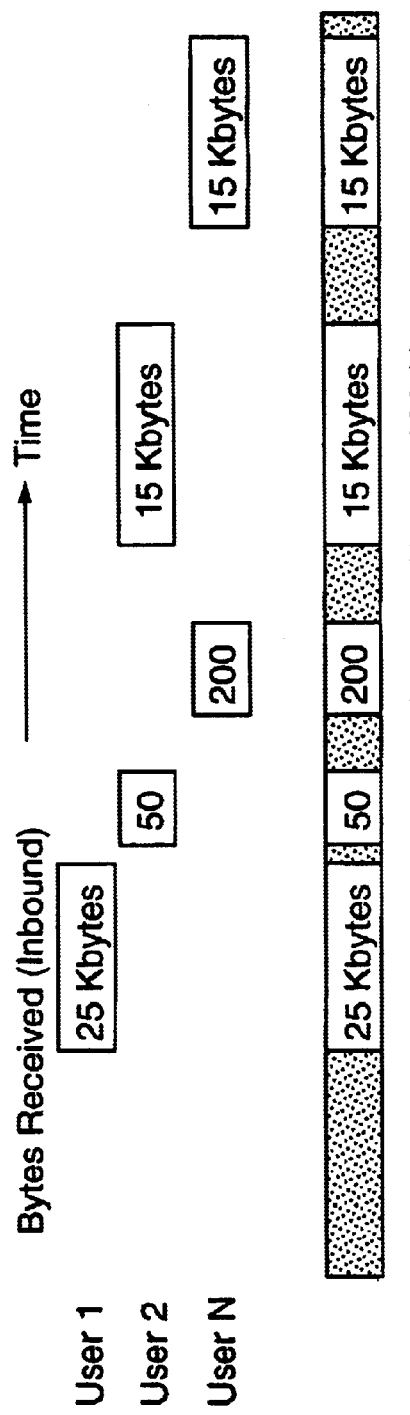

In general, the use of a higher bandwidth implies that fewer channels are available for other purposes, such as for carrying voice and/or data traffic. However, there is a dependence on the power transmitted in the channel. FIG. 7 shows the basic relationship for a single user. A simple relationship is depicted between the data rate and channel bandwidth to illustrate the operation of the bandwidth on demand system. It is noted that various coding and other techniques can be used to provide higher bandwidths in any given channel bandwidth. Multiple users can also be combined in one channel as shown in FIGS. 6C and 6D.

Figure 8:
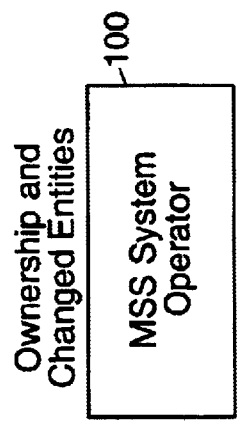
FIG. 8 is a simplified block diagram illustrating the relationships between ownership and charged entities.
Figure 8:
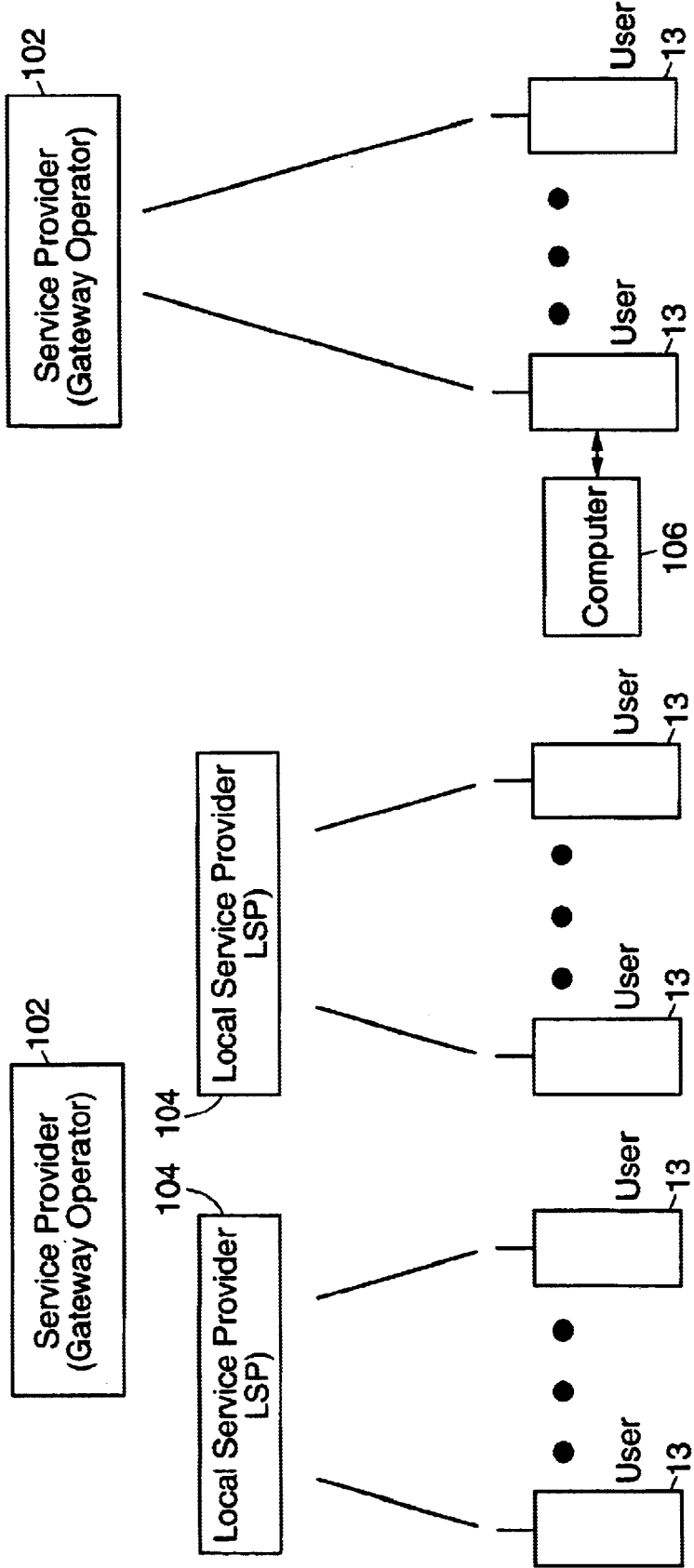

As is shown in FIG. 8, there are generally two entities to be charged in a commercial mobile satellite system (MSS) of a type exemplified by the system 10 of FIG. 1. A system operator 100 owns and operates the satellite capacity and ground infrastructure required to support the satellites 12, and also provides interconnecting networks (e.g., the GDN 39) between the gateways 18. This infrastructure includes the SOCC 36 and the GOCC 38, as shown in FIG. 1. The call-by-call control is provided by the gateways 18. The gateways 18 may be owned and operated by Service Providers (SPs) 102, which may or may not have one or more Local Service Providers (LSPs) 104 which vend the satellite system services to the users (via satellites 12 and the user terminals 13). The user terminals 13 are typically owned by the users, and may be bidirectionally coupled to one or more client computers 106 (only one of which is shown in FIG. 8). The client computer 106 is assumed to include the necessary software to access an ISP and the Internet via the gateway 18.

The revenue stream flows from the users to the LSPs 104 and/or the SPs 102 to the Service Operator 100. In general, and by example, the end user may be billed at a flat rate per session, or by some unit of time (e.g., one minute), or by some unit of the data transfer (e.g., by the byte (8 bits), or by the word, or by the packet), or by some unit specific to the link(s) involved in carrying the session (e.g., by the Walsh code).

The LSP 104 purchases capacity from the SP 102 to satisfy its demand on some basis, which may be the same basis at which the LSP 104 charges its users. The SP 102 in turn purchases capacity from the MSS system operator 100 according to some business arrangement between them, such as a wholesale rate or some other cost basis. Since one to many users can share a channel some occupancy rate or value is used to determine the amount of raw satellite system resources used or consumed in order to properly account for the system resources used in providing sessions for the user terminals 13.

This determination could be based on, for example, the use of the forward and return links at a flat rate, or the use of the forward and return links by the minute (or second, or some other unit of time), or on the number of Walsh codes in use, or by the byte, or based on a shared use of the channel on a byte or some other basis.

In one preferred embodiment of this invention the accounting for the usage of the satellite communication system 10 is based on a byte transmitted and/or a byte received basis, either for a single or shared use of the forward and the return links. Alternatively, a flat rate may be charged, either alone or else modified by the number of bytes transmitted and/or received by a given one of the user terminals 13. The SP 102/LSP 104 use of the satellite system resources are thus charged appropriately, and may be converted into some appropriate charge that the users are accustomed to seeing.

FIG. 9A is a block diagram of a gateway 18 that is coupled to a user terminal 13 through at least one satellite 10, and also to the mobile satellite system (MSS) system operator 100 through the ground data network (GDN) 39), and shows the charging and collecting for a return link (from the user terminal 13 to the gateway 18. FIG. 9B is a similar block diagram of the gateway 18 coupled to the user terminal 13 through at least one satellite 10, and also to the MSS operator 100 through the GDN 39, and is useful in explaining a method of charging and collecting for the forward link (from the gateway 18 to the user terminal 13). In both cases the MSS operator 100 includes a Service Provider (SP) billing module 100A, which could be software running on a data processor of the MSS operator 100.

In the illustrated embodiments the gateway 18 includes an RF section 18A coupled to a signal demodulator 18B and to a decoder 18C. The decoder 18C comprises, in one presently preferred embodiment, a byte counter 18D for counting bytes received from the return (FIG. 9A) or transmitted to the forward link (FIG. 9B). The number of bytes may be determined from a field of the received or trasnmitted packets. Alternatively, the number of bytes could be deterinined as a function of some assumed average number of bytes per packet for a given session. The decoder 18C is coupled to a channel information block 18E and to a calculate satellite system usage block 18F. The channel information block 18E is also coupled to a shared user information block 18G, which in turn is coupled to the calculate satellite system usage block 18F. Since the gateway 18 is assumed to be responsible for setting up and maintaining the link(s) to a given one of the user terminals 13, the gateway 18 is assumed to have knowledge of the number of users per channel, and thus the number of users that are sharing a given channel. In this manner the cost per byte may be weighted as a function of the number of users that are sharing the particular channel at any given time, with the cost declining as the number of users on the channel increases. The calculate satellite system usage block 18F provides outputs to a link direction block 18H, which in turn provides an output to a user billing block 181. The user billing block 18I is responsible for determining the SP 102 or LSP 104 billing for a particular one of the user terminals 13. The user terminal billing may be a function of an output of the MSS operator billing block 10A, which is provided to the gateway 18. Although shown as a separate input in FIGS. 9A and 9B, this billing-related information is preferably also sent over the GDN 39. The shared user information block 18G also provides an input to a gateway aggregate usage calculation block 18J, which is responsible for accumulating or aggregating all of the system usage data for all of the user terminals 13 served by the gateway 18, and for periodically reporting this information to the MSS Operator 100 via the GDN 39. Based on this information the MSS Operator 100, is enabled to determine how much to bill the various SPs 102 and LSPs 104 for the usage of the satellite system 10 resources.

The gateway 18 also includes a signal router block 18K for, in the case of FIG. 9A, outputting datagrams from the user terminals 13 to the network, such as the Internet via the PSTN, or in the case of FIG. 9B, for inputting datagrams from the network.

In a further preferred embodiment of this invention the MSS Operator 100 charges the SP 102 based on a usage of the channel(s). As was shown in FIG. 6, where different channel usages are depicted, the SP 102 is charged by a per cent usage of the channel. For example, if the usage of a 1.25 MHz channel is charged at $X per hour, and if the SP 102 uses that channel for one half hour, then the SP 102 is charged $X/2. Referring also to FIG. 7, if two 1.25 MHz channels are each used for one half hour, the SP 102 is charged $X, while if four 1.25 MHz channels are each used for one half hour, the SP 102 is charged $2X. The charging in this case may be considered to be based on a (bandwidth*time) product.

It is also within the scope of this invention to charge based on predictive system resource allocations. For example, the GOCC 38 considers in predictively allocating resources certain inputs from the SPs 102, such as expected demand and/or historical demand. If a particular SP 102 indicates that two channels will be required during some future time period, and if only one is actually used, then the second channel that a was allocated to that SP 102 is essentially wasted during that future time period. In this case the $X per channel charge may be varied, such as on a sliding scale, as a function of how well the predicted demand was actually met. For example, if the actual demand and channel usage is within 10% of the demand predicted by the SP 102, then the channel is charged at the $X rate, however if actual demand and channel usage is only within 20% of the demand predicted by the SP 102, then the channel is charged at a higher $1.1X rate, etc.

The use of such a sliding scale can be employed for charging other things besides the (bandwidth*time) product. For example, it can be used to advantage when applied to actual versus predicted satellite usage, actual versus predicted number of bytes transferred, etc.

It is also within the scope of this invention to charge for the use of the system 10 based on content that is transferred through the system. By example, Y cents may be charged per Internet page that is downloaded, where the gateway 18 records the number of downloaded pages and bases its billing on the recorded number of pages. Other units of content can be employed, such as responses to requests for data transmitted from the user terminals 13. Such responses can include, but are not limited to, stock quotation(s) requested by a user terminal 13, sports score(s) requested by a user terminal 13, or audio or video unit(s) requested, or per direction given, etc. In all of these cases the MSS System Operator 100 generates billing for the SPs 102 based on the content delivered, more particularly oh one or more predetermined units of content (e.g., web pages and/or specific user requests for information or content data).

Thus, while the invention has been particularly shown and described with respect to preferred embodiments thereof, it will be understood by those skilled in the art that changes in form and details may be made therein without departing from the scope and spirit of the invention. By example, it is within the scope of this invention to employ other than a low earth orbit constellation of satellites, such as one or more mid-earth orbit satellites (e.g., satellites that orbit at approximately 10,000 km to 19,000 km), or to employ one or more geosynchronous orbit satellites. As was noted previously, it is also within the scope of this invention to employ satellites that perform on-board processing of communications traffic, with or without satellite cross-links, as opposed to the relatively simpler bent pipe repeater satellites. The teaching of this invention may also be employed to advantage in satellite communications systems that use other than spread spectrum modulation techniques and/or code division, multiple access techniques. By example, the teaching of this invention can be used with satellite communications systems that employ time division/multiple access (TDMA) techniques, although in this case it may not be possible to simultaneously support as many users per channel.

Furthermore, it can be appreciated that for those embodiments of this invention that record other types of units of data transfer and/or units of content, then the byte counter 18D can be replaced or supplemented with another type of counter, such as a downloaded page counter, etc.

As such, it should be realized that the teachings of this invention are not to be construed to be limited to only the disclosed embodiments, but are to be given a scope that is commensurate with the scope of the appended claims.

What is claimed is:

1. A method for operating a satellite communications system, comprising the steps of:

establishing a session with a user terminal by way of a gateway that is coupled to the user terminal through at least one satellite via an inbound link and an outbound link, the gateway being further coupled to a data communications network;

during the session, determining and storing system usage data at the gateway expressive at least of a type of connection made by the user terminal, an indication of an amount of power expended by the at least one satellite to maintain the session, a duration of the session, and a number of units of data transfer that are used during the session on at least one of the inbound link and the outbound link; and after a termination of the session, accumulating the system usage data, outputting the system usage data from the gateway to a system resource allocation and billing center for use in billing, and determining an amount to bill for the session based at least in part on the determined number of units of data transfer.

2. A method as in claim 1, wherein the units of data transfer is comprised of bytes.

3. A method as in claim 1, wherein the step of determining an amount to bill is also based on a number of user terminals that simultaneously share a communication channel that carries at least one of said inbound link or said outbound link.

4. A method as in claim 1, wherein the step of determining an amount to bill is executed at a mobile satellite system operator site based on aggregated user billing information received from the gateway.

5. A method as in claim 1, wherein the step of determining an amount to bill is executed at the gateway.

6. A satellite communications system, comprising:

at least one user terminal;

at least one satellite;

at least one gateway coupled to a data communications network and having (a) an RF transceiver for establishing and maintaining a session with said user terminal through said at least one satellite via an inbound link and an outbound link, (b) a processor for determining and storing system usage data expressive at least of a type of connection made by the user terminal, an indication of an amount of power expended by the at least one satellite to maintain the session, and a duration of the session, and a number of units of data transfer that are used during the session on at least one of the inbound link and the outbound link, and (c) an interface for outputting the stored system usage data; and a unit for receiving the system usage data and determining an amount to bill for the session based at least in part on the determined number of units of data transfer.

7. A system as in claim 6, wherein the units of data transfer are bytes.

8. A system as in claim 6, said determining unit further considers a number of user terminals that simultaneously share a communication channel.

9. A system as in claim 6, wherein said unit for determining an amount to bill is located at a mobile satellite system operator site, and operates on aggregated user billing information received from said gateway.

10. A system as in claim 6, wherein said unit for determining an amount to bill is located at a mobile satellite system operator site, and operates on aggregated user billing information received from said gateway for determining an amount to bill an operator of said gateway.

11. A system as in claim 6, wherein said unit for determining an amount to bill is located at said gateway.

12. A method for operating a satellite communications system for coupling a user terminal to a data communications network, comprising the steps of:

establishing a connectionless packet data transmission link between the user terminal and a gateway that is coupled to the user terminal through at least one satellite via an inbound link and an outbound link, the gateway being further coupled to the data communications network and being associated with a gateway service provider;

deriving billing-related information by counting a number of units of data that comprise data packets that are transmitted over at least one of the inbound link and the outbound link;

aggregating the billing-related information with billing-related information for other user terminals;

transferring the aggregated billing-related information to a satellite communication system operator site; and at the satellite communication system operator site, determining an amount to bill the gateway service provider based at least in part on the aggregated billing-related information.

13. A method as in claim 12, wherein the units of data are bytes.

14. A method as in claim 12, wherein the determined amount to bill is a function of a number of user terminals that simultaneously share a communication channel through which at least one of said inbound link and said outbound link are carried.

15. A method as in claim 12, wherein the step of establishing a connectionless packet data transmission link includes a step of varying a bandwidth of the link to accommodate different data rate requirements.

16. A method for operating a satellite communications system, comprising the steps of:

establishing a session with a user terminal by way of a gateway that is coupled to the user terminal through at least one satellite via an inbound link and an outbound link, the gateway being further coupled to a data communications network;

during the session, determining and storing system usage data in the gateway expressive at least of a type of connection made by the user terminal, an indication of an amount of power expended by the at least one satellite to maintain the session, a duration of the connection, and determining a product of bandwidth*time that is used on at least one of the inbound link and the outbound link; and after a termination of the session, accumulating system usage data, outputting the system usage data from the gateway to a system resource allocation and billing center for use in billing, and determining an amount to bill for the session based at least in part on the determined product.

17. A method for operating a satellite communications system, comprising the steps of:

allocating satellite system resources to a satellite system service provider based at least in part on a predicted demand for the satellite system resources for the satellite system service provider;

during a time that the satellite system resources are allocated to the satellite system service provider, recording an actual demand for the satellite system resources;

comparing the actual demand to the predicted demand to determine a difference between the actual demand and the predicted demand; and billing the satellite system provider an amount that is a function of the determined difference between the actual demand and the predicted demand.

18. A method for operating a satellite communications system, comprising the steps of:

establishing a session with a user terminal by way of a gateway that is coupled to the user terminal through at least one satellite via an inbound link and an outbound link, the gateway being further coupled to a data communications network;

during the session, determining and storing system usage data in the gateway expressive at least of a type of connection made by the user terminal, an indication of an amount of power expended by the at least one satellite to maintain the session, a duration of the connection, and a number of units of content that are transferred at least from the gateway to the user terminal; and after a termination of the wireless connection, accumulating the system usage data and outputting the system usage data from the gateway to a system resource allocation and billing center for use in billing, and determining an amount to bill for the session based at least in part on the determined number of units of content.

19. A method as in claim 18, wherein the units of content are comprised of pages.

20. A method as in claim 18, wherein the units of content are comprised responses to requests for data transmitted from the user terminal.

21. The method as in claim 17, wherein said satellite system resources are selected from the group consisting of bandwidth * time product, satellite usage, number of bytes transferred and units of content transferred.

22. The method as in claim 17, wherein said satellite system resources include units of content transferred.

23. The method as in claim 1, wherein the step of establishing a session includes a step of varying a bandwidth of at least one of the inbound link and the outbound link to accommodate different data rates.

* * * * *